(12) United States Patent
Overbye

(10) Patent No.: US 8,896,450 B1
(45) Date of Patent: Nov. 25, 2014

(54) FISH STRIKE ALARM

(76) Inventor: Phillip H. Overbye, Toutle, WA (US)

( * ) Notice: Subject to any disclaimer, the term of this patent is extended or adjusted under 35 U.S.C. 154(b) by 798 days.

(21) Appl. No.: 12/977,986

(22) Filed: Dec. 23, 2010

Related U.S. Application Data

(60) Provisional application No. 61/289,462, filed on Dec. 23, 2009.

(51) Int. Cl.
  *G08B 21/22* (2006.01)
(52) U.S. Cl.
  USPC ........................ 340/573.1; 340/573.2; 43/15
(58) Field of Classification Search
  USPC ........ 340/573.1, 539.21, 573.2; 43/17, 43.15, 43/15, 18.1; 318/581
  See application file for complete search history.

(56) References Cited

U.S. PATENT DOCUMENTS

| | | | |
|---|---|---|---|
| 4,792,796 A * | 12/1988 | Bradshaw et al. ....... | 340/539.21 |
| 5,097,618 A * | 3/1992 | Stoffel ............................... | 43/17 |
| 5,228,228 A | 7/1993 | Meissner | |
| 5,495,688 A | 3/1996 | Sondej et al. | |
| 5,859,517 A * | 1/1999 | DePasqua ..................... | 318/581 |
| 5,867,931 A | 2/1999 | Morris et al. | |
| 5,996,268 A | 12/1999 | Buczkowski et al. | |
| 6,293,043 B1 | 9/2001 | Zwettler | |
| 6,397,510 B1 * | 6/2002 | Klein ................................ | 43/17 |
| 7,040,052 B1 * | 5/2006 | Paulk ................................ | 43/17 |
| 2003/0122676 A1 * | 7/2003 | Cuijpers et al. ............ | 340/573.1 |
| 2005/0231356 A1 * | 10/2005 | Bish et al. ................... | 340/539.1 |
| 2006/0156612 A1 * | 7/2006 | Brzozowski ................. | 43/43.15 |
| 2007/0169395 A1 | 7/2007 | Rayfield | |
| 2008/0218357 A1 * | 9/2008 | March et al. ............... | 340/573.1 |

* cited by examiner

*Primary Examiner* — Andrew Bee
*Assistant Examiner* — Kaleria Knox
(74) *Attorney, Agent, or Firm* — Robert C. Montgomery; Montgomery Patent & Design

(57) ABSTRACT

An automatic alarm system that indicates the presence of a fish strike at an unattended fishing pole comprises a small transmitter located at an upper tip of the fishing pole activated by a motion sensor that energizes a transmitter and a light whenever a fish moves the rod. The sensitivity of the movement is adjustable via a switch, which allows the user to ignore small movement caused by breezes or other effects. A receiver is carried by the fisherman, comprising a small enclosure which is provided with both a vibrating and audible alarm. The receiver is capable of receiving pages up to hundreds of feet away. Both components are powered by user replaceable batteries.

18 Claims, 6 Drawing Sheets

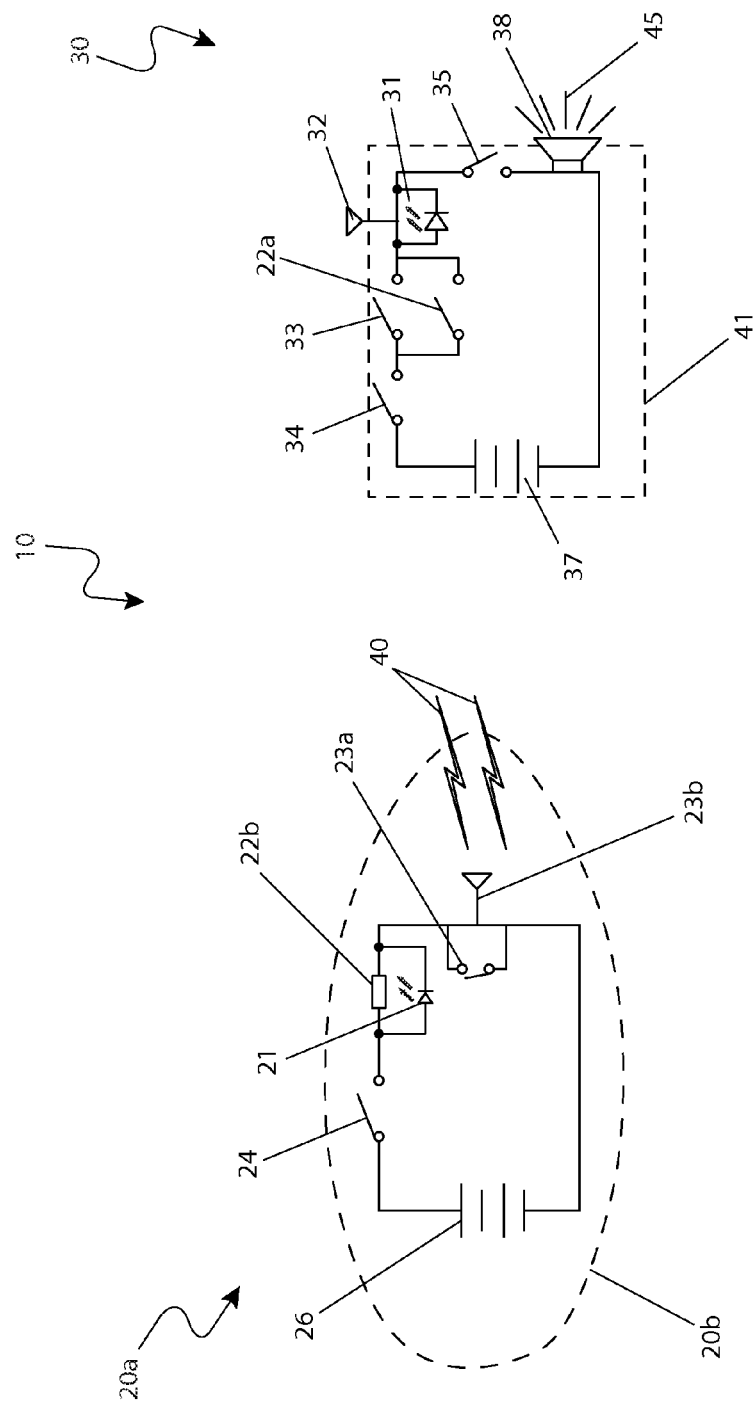

FISH STRIKE ALARM

RELATED APPLICATIONS

The present invention was first described in and claims the benefit of U.S. Provisional Application No. 61/289,462 filed Dec. 23, 2009, the entire disclosures of which are incorporated herein by reference.

FIELD OF THE INVENTION

The present invention relates generally to fishing rod alarms, and in particular, to a wireless fishing rod alarm including a variety alarm functions.

BACKGROUND OF THE INVENTION

The technology used by anglers to catch fish has become increasingly complex in nature. Fishermen no longer rely on the traditional hook and worm approach to attract their game. Instead, a broad range of products have hit the market, all designed to aid the fisherman in catching fish more quickly.

In general, fishermen have to hold the fishing rod no matter the additional technologies utilized. While some may argue that this is a perfect way to spend a day, long periods of holding a rod while nothing is happening is boring and tedious.

As a result, many fishermen resort to attaching or bracing their rod against something while waiting for a fish to bite. While this method may work, it often results in a lost catch or even a lost fishing rod if a fish should strike when the fisherman is away or unaware.

Various attempts have been made to provide apparatuses which alert a fisherman as to a bite upon a fishing line. Examples of these attempts can be seen by reference to several U.S. patents. U.S. Pat. No. 5,495,688, issued in the name of Sondej et al., describes a fish strike alarm system actuated when a fish pulls downwardly on a fishing line. The Sondej system emits a high pitched alarm or similar indicator means when actuated.

U.S. Pat. No. 5,867,931, issued in the name of Morris et al., describes an electrical strike alarm including a tension detector placed in line with the fishing line to activate both an audio and visual alarm when a struck fish affects a change in the fishing line tension.

U.S. Pat. No. 6,397,510, issued in the name of Klein, describes a fishing bobber including a transmitter housed within the bobber which is actuated when a line attached to the bobber is placed under tension such as by a fish.

While these apparatuses fulfill their respective, particular objectives, each of these references suffer from one (1) or more of the aforementioned disadvantages. Many such apparatuses include alarms which can be easily missed in many situations. Also, many such apparatuses limit a user's movement either physically or to a certain range according to the type of alarm. Furthermore, many such apparatuses do not provide features of adjustability which allow a user to adjust parameters of the sensor and alarm to accommodate their particular situation and preferences. In addition, many such apparatus include sensors which are difficult or time consuming to set up or which may require significant resetting between activations. Accordingly, there exists a need for a fish strike alarm without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for a reliable, customizable, easily resettable fish strike alarm which does not require the user to remain in visual or auditory range of a fishing rod nor inhibit their movement in any way. Thus, the object of the present invention is to solve the aforementioned disadvantages and provide for this need.

To achieve the above objectives, it is an object of the present invention to determine whether an aquatic animal such as a fish has come in contact with a fishing line on an unattended fishing rod and alert a user when this contact occurs. The apparatus includes a sensor/transmitter device attachable to a fishing rod and a pager carried by the user.

Another object of the present invention is to allow a user to receive an alert of contact to the fishing line even when they are a distance away from the fishing rod. This is achieved by wireless transmission of an alert from the sensor/transmitter device to the pager.

Yet still another object of the present invention is to prevent accidental damage to the sensor/transmitter device should the fishing rod fall into water when the user is away by including a waterproof housing.

Yet still another object of the present invention is to include an electronic motion sensor which detects motion of the fishing rod or a nearby body of water and produces a signal which can then be transmitted to the pager. The motion sensor preferably includes an ultrasonic motion sensing unit.

Yet still another object of the present invention is to allow a user to adjust the sensitivity of the sensor using a sensor switch. In this manner, the user can ensure that incidental motioning of the fishing rod caused by wind or the like does not trip the alarm.

Yet still another object of the present invention is to provide quick, secure attachment of the sensor/transmitter device to a fishing rod with a rod attachment bracket and a thumb screw. The clamping function of the rod attachment and the adjustable thumb screw enable secure engagement of fishing rod portions of varying diameters.

Yet still another object of the present invention is to include a pager enclosure and a clip which enable the user to quickly attach the pager to an article of clothing or similar location.

Yet still another object of the present invention is to provide an alert to the user upon receipt of an alert from the sensor/transmitter device by the pager. The pager includes a plurality of alarm functions including a pager light providing a visual alert, a speaker providing an audible alert, and a vibrating mechanism providing a tangible alert. The pager further includes a volume switch for adjusting the volume of the speaker and the power of the vibrating mechanism.

Yet still another object of the present invention is to allow the user to adjust parameters of transmitting circuitry of the sensor/transmitter and receiving circuitry of the pager in order to facilitate proper operation of the wireless functions of the apparatus over a desired area while conserving battery power. The strength of the transmitting radio frequency and the radio frequency of the receiver are controlled by a transmitter switch and a receiver switch, respectively.

Yet still another object of the present invention is to be able to function as a security device when not used during fishing by utilizing the sensor to monitor a desired physical location and receiving an alert over a distance when that location is disturbed.

Yet still another object of the present invention is to provide a method of utilizing the device that provides a unique means of acquiring the apparatus attaching the sensor/transmitter to a desired position on a fishing rod with the thumb screw and the rod attachment; selecting a desired setting for the sensor switch, the transmitter switch, the receiver switch, and the volume switch; placing the pager in a desired secure position on the user by using the clip; transmitting a current from the sensor to the transmitter when an aquatic animal is on the line of the fishing rod; transmitting a signal from the transmitter to the receiver and relaying the received signal to the pager light and audible alerting means with the speaker; retrieving the aquatic animal on the fishing rod in a conventional manner; deactivating the sensor/transmitter and pager as necessary; and repeatedly utilizing the apparatus as desired.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
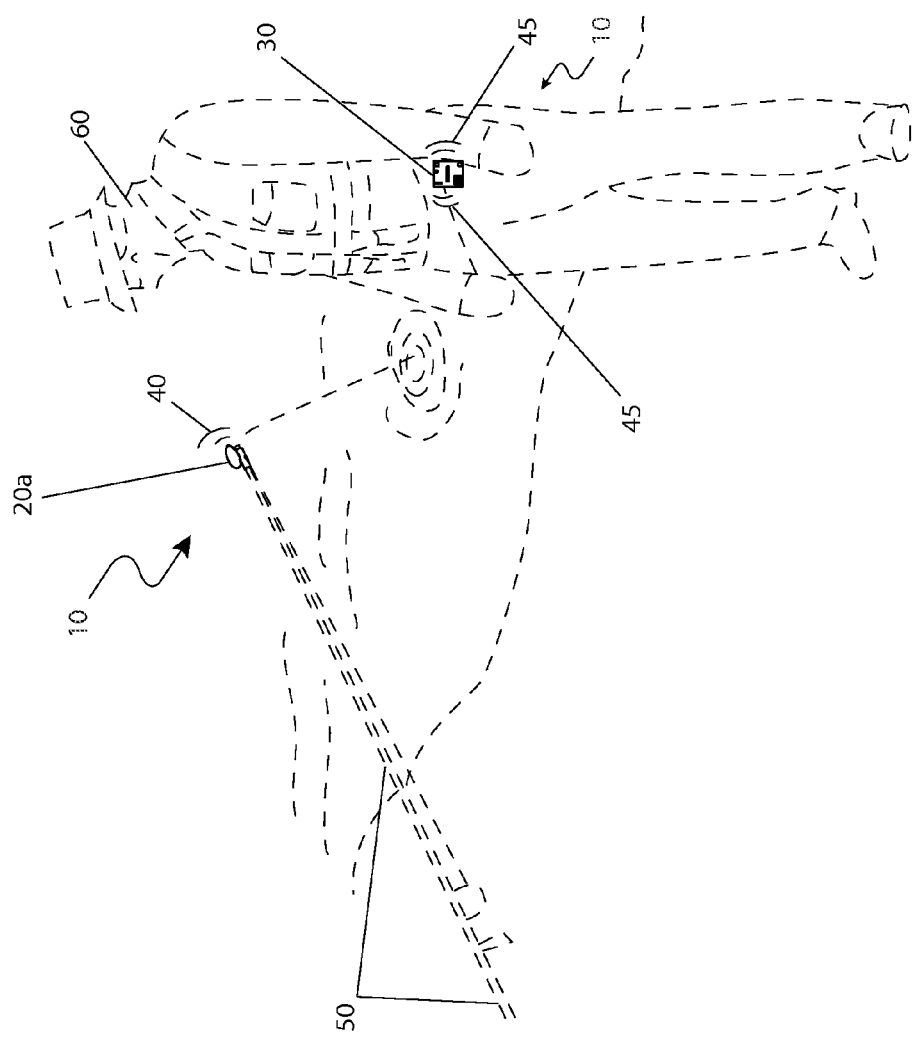
FIG. 1 is an environmental view of a fish strike alarm 10, according to a preferred embodiment of the present invention.

DESCRIPTIVE KEY 10 fish strike alarm
20a sensor/transmitter device
20b sensor/transmitter enclosure
21 light
22a sensor switch
22b sensor
23a transmitter switch
23b transmitter
24 on/off switch
25 battery compartment
26 battery
27 brace
28a thumb screw
28b aperture
29a rod attachment
29b gap
30 pager
31 pager light
32 receiver
33 receiver switch
34 pager on/off switch
35 volume switch
36 pager battery compartment
37 pager battery
38 speaker
39 clip
40 signal
41 pager enclosure
45 audible alerting means
50 fishing rod
60 user
70 electrical wiring

DETAILED DESCRIPTION OF THE PREFERRED EMBODIMENT

The best mode for carrying out the invention is presented in terms of its preferred embodiment, herein depicted within FIGS. 1 through 6. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a fish strike alarm (herein described as the "apparatus") 10, which provides a means for determining whether an aquatic animal such as fish or the like has come in contact with an end portion of fishing line on an unattended fishing rod 50. The apparatus 10 comprises a sensor/transmitter device 20a which senses the presence of a fish via a sensor 22b and transmits a signal 40 to a pager 30 which alarms a user 60. Materials required to fabricate said apparatus 10 are readily available and well known to manufacturers of goods of this type.

Referring now to FIG. 1, an environmental view of the apparatus 10, according to the preferred embodiment of the present invention, is disclosed. The apparatus 10 enables the user 60 to be a distance away from an existing fishing rod 50 to alarm said user 60 via the pager 30 when an aquatic animal is in contact with the fishing line as abovementioned. The sensor/transmitter 20a (also see FIGS. 2 and 3) is positioned on a desired distal portion of the fishing rod 50 and the pager 30 (also see FIGS. 4 and 5) is positioned on or carried by a desired portion of the user 60. The sensor/transmitter 20a and the pager 30 are fabricated of plastic in an injection molding process, yet other materials and processes may be utilized without limiting the functions of the apparatus 10.

Figure 2:
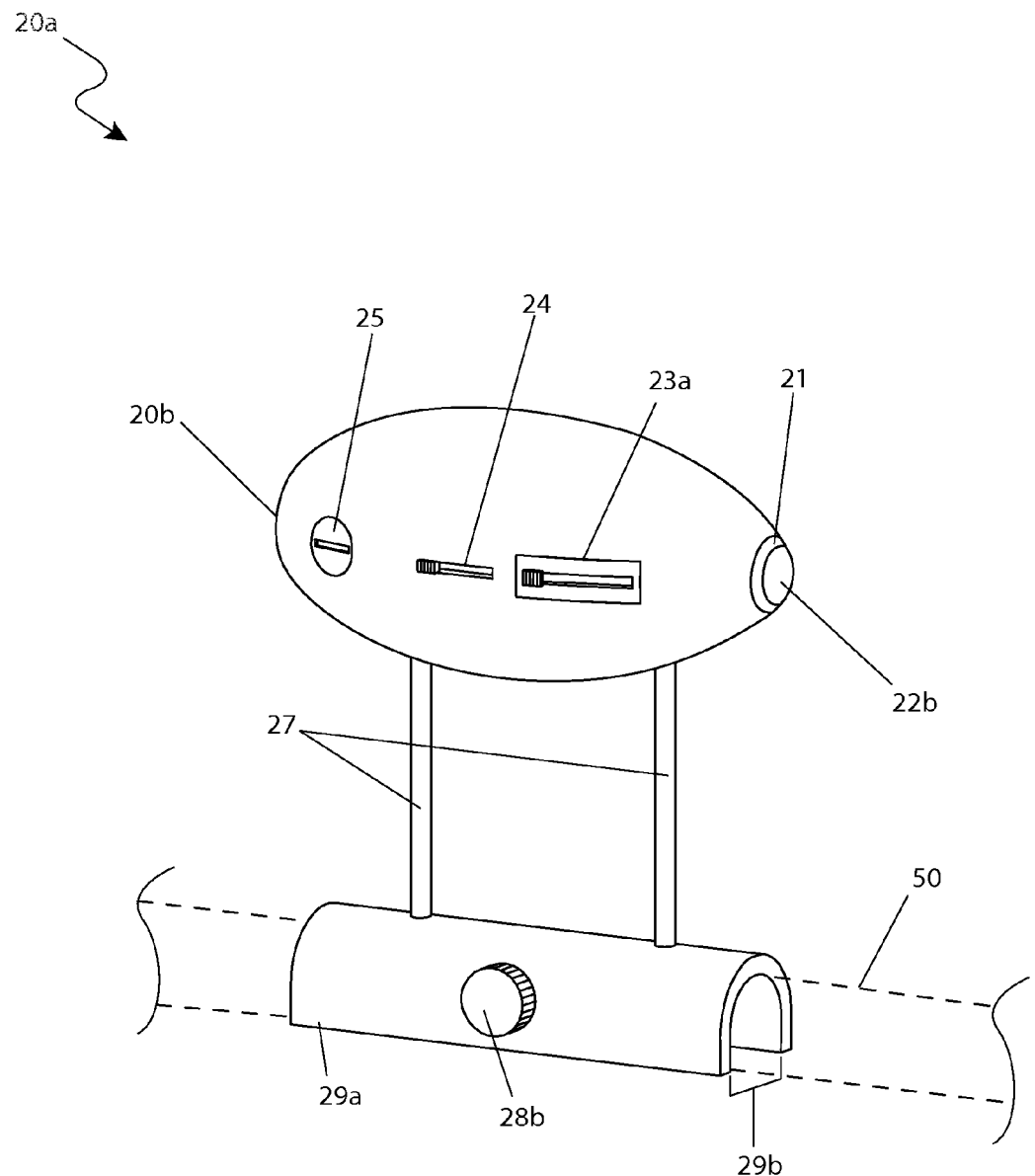
FIG. 2 is a front perspective view of a sensor/transmitter 20a, according to a preferred embodiment of the present invention.
Figure 3:
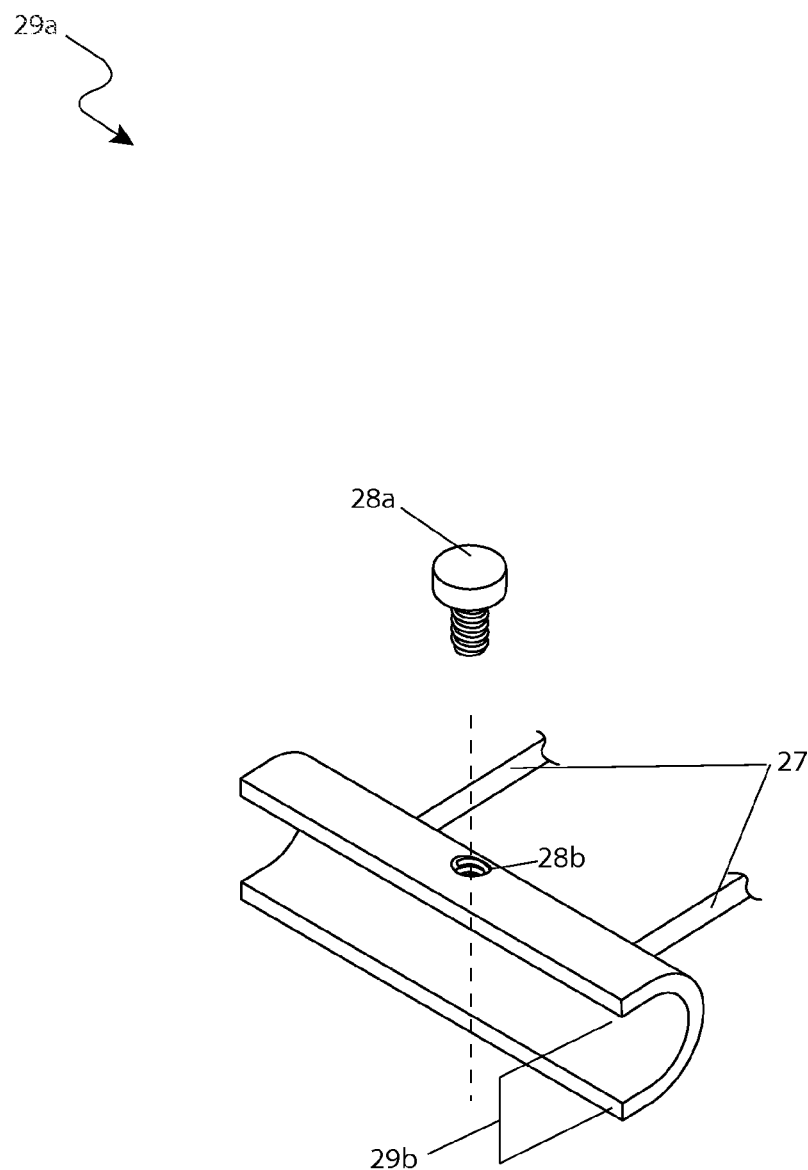
FIG. 3 is a perspective view of a rod attachment 29a, according to a preferred embodiment of the present invention.

Referring now to FIG. 2, a front perspective view of sensor/transmitter 20a and FIG. 3, a perspective view of the rod attachment 29a, according to the preferred embodiment of the present invention, are disclosed. The apparatus 10 comprises a sensor/transmitter 20a which provides for a device which senses a physical stimulus, which is preferably the aquatic animal biting the bait upon the fishing rod 50, and transmits a signal 40 to the pager 30 via a transmitter 23b. The sensor/transmitter 20a comprises a sensor/transmitter enclosure 20b which comprises an oblong shape, yet other shapes may be provided without limiting the functions of the apparatus 10. The sensor/transmitter enclosure 20b is preferably comprised of a water-resistant casing which prohibits the passage of water to internal components. The sensor/transmitter 20a is fabricated in a variety of colors to complement and correspond to other fishing gear.

A front portion of the sensor/transmitter enclosure 20b comprises a light 21, a transmitter switch 23a, an on/off switch 24, and a battery compartment 25. The sensor/transmitter 20a receives power via a conventional user replaceable battery 26 (see FIG. 6) housed within the sensor/transmitter enclosure 20b and is accessed via the battery compartment 25. The electrical signal from the battery 26 is manipulated via a conventional on/off switch 24 which enables the user 60 to position the sensor/transmitter 20a to an ON/activated position or an OFF/deactivated position as desired. The on/off switch 24 is preferably a conventional electrical switching device such as, but not limited to: a sliding switch, a pushbutton, a toggle switch, or the like.

The light 21 and a sensor 22b are positioned on a proximal portion of the sensor/transmitter enclosure 20b and provide an illumination means to the sensor/transmitter 20a when said sensor 22b has been activated to visually indicate to the user 60 that an aquatic animal has made contact with the line. The light 21 and sensor 22b are preferably positioned away from the fishing rod 50. The light 21 is comprised of a light-emitting diode (LED), yet other illumination means may be provided without limiting the functions of the apparatus 10. The sensor 22b is preferably an ultrasonic motion sensor or detector that transforms physical motion into an electrical signal to be transmitted to the pager 30 via a transmitter 23b (see FIG. 6) and also illuminates the light 21. The sensor 22b senses a change in its field of view by sending out pulses to measure the reflection off of the body of water in which the fishing rod 50 is being utilized and may be manipulated with a sensor switch 22a located on the pager 30. The sensor switch 22a adjusts the sensitivity of the sensor 22b. The transmitter 23b receives the indication from the sensor 22b and sends a signal 40 (see FIGS. 1 and 6) to the pager 30. The transmitter 23b is located at an internal position within the sensor/transmitter enclosure 20b and is controlled via a transmitter switch 23a. The transmitter switch 23a is preferably a multi-positional sliding switch which enables the user 60 to adjust the strength of the transmitting radio frequency which is dependant upon the distance between the user 60 and the fishing rod 50. Other switching devices may be utilized such as, but not limited to: pushbuttons, toggle switches, or the like without limiting the scope of the apparatus 10.

The sensor/transmitter 20a is attached to a fishing rod 50 via a rod attachment 29a which is attached to the sensor/transmitter enclosure 20b via a pair of integrally molded braces 27. The braces 27 extend downwardly from the sensor/transmitter enclosure 20b and are fabricated from a material similar to said sensor/transmitter enclosure 20b. The rod attachment 29a comprises a "C"-shaped form which encompasses a desired portion of the fishing rod 50. The fishing rod 50 is set within a gap 29b of the rod attachment 29a to partially encompass an exterior portion of said fishing rod 50. The gap 29b will preferably correspond to the average outer diameters of most fishing rods 50. The rod attachment 29a is adjusted and secured to the fishing rod 50 with a digit-operated clamping device which includes a thumb screw 28a. The thumb screw 28a engages an aperture 28b on the rod attachment 29a and further the exterior surface of the fishing rod 50 to tighten or loosen said rod attachment 29a to a desired position upon said fishing rod 50. The thumb screw 28a and aperture 28b preferably comprise opposing threads which engage each other in a common fashion. The rod attachment 29a and thumb screw 28a are fabricated from or coated with non-damaging materials such as, but not limited to: plastic, rubber, or the like so as to prohibit marring of the fishing rod 50.

Figure 4:
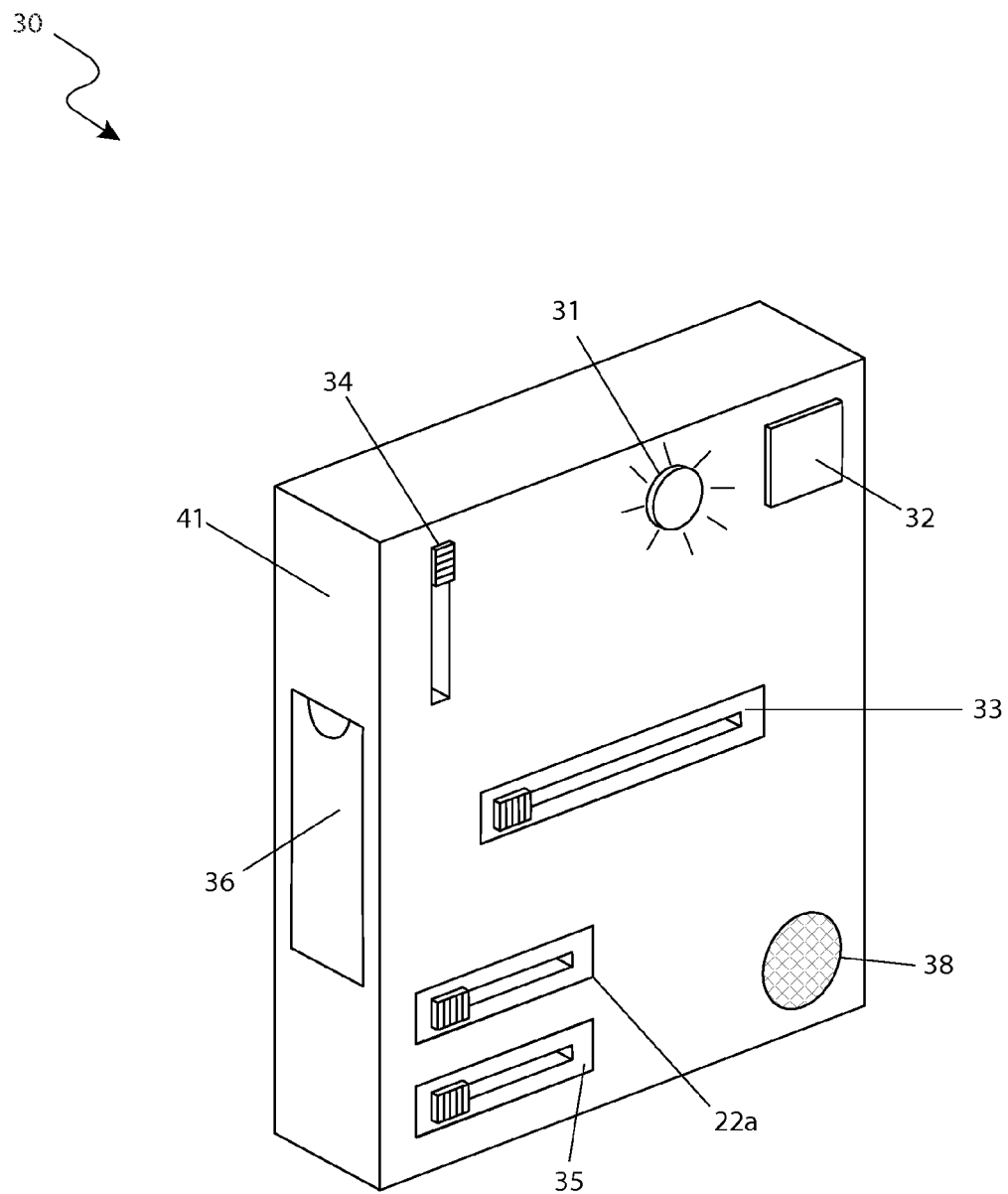
FIG. 4 is a front perspective view of a pager 30, according to a preferred embodiment of the present invention.
Figure 5:
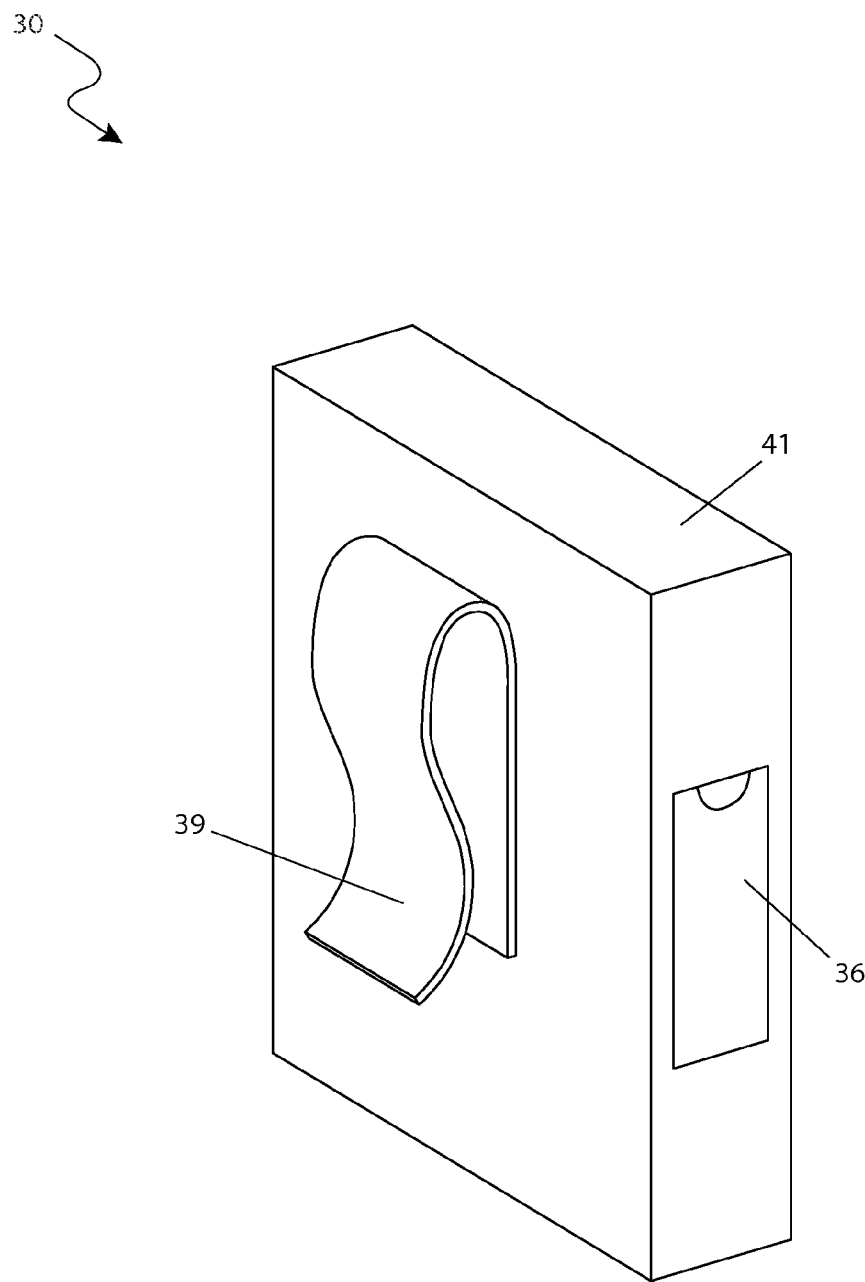
FIG. 5 is a rear perspective view of the pager 30, according to a preferred embodiment of the present invention; and, FIG. 6 is an electrical block diagram of the fish strike alarm 10, according to a preferred embodiment of the present invention.

Referring now to FIG. 4, a front perspective view of the pager 30 and FIG. 5, a rear perspective view of the pager 30, according to the preferred embodiment of the present invention, are disclosed. The apparatus 10 comprises a rectangular pager 30 which alerts the user 60 that the sensor 22b has been activated. The pager 30 includes a pager enclosure 41 to provide protection of internal devices. The pager enclosure 41 is secured in a downwardly hanging position via a conventional clip 39. The clip 39 is located on a rear surface of the pager enclosure 41 and enables the user 60 to slidably engage said pager enclosure 41 to a secured position within a pocket or belt as desired. The clip 39 is integrally molded or attached via mechanical fastening devices to the pager enclosure 41 and is preferably fabricated from flexible materials such as, but not limited to: spring steel, plastic, or the like. The pager enclosure 41 is fabricated from a water-resistant material similar to the sensor/transmitter 20a.

A front portion of the pager enclosure 41 comprises a sensor switch 22a, a pager light 31, a receiver 32, a receiver switch 33, a pager on/off switch 34, a volume switch 35, and a speaker 38. As abovementioned, the sensor switch 22a adjusts the sensitivity of the sensor 22b so as to differentiate between strong winds or the like and an actual aquatic animal. The receiver 32 enables the pager 30 to obtain the signal 40 from the transmitter 23b and further alert the user 60 with a sound or vibration. The radio frequency of the receiver 32 is adjusted via a multi-position receiver switch 33 which enables the user 60 to adjust the strength of the transmitting radio frequency. The receiver switch 33 is preferably multi-positional sliding switch, yet other switching devices may be utilized such as, but not limited to: pushbuttons, toggle switches, or the like.

The pager 30 comprises a conventional pager on/off switch 34 which enables the user 60 to activate and deactivate said pager 30. The on/off switch 34 is comprises a switching device such as, but not limited to: a pushbutton, a toggle switch, a sliding switch, or the like. In an ON position the pager 30 receives current from a conventional user replaceable pager battery 37 which is enclosed in a pager battery compartment 36 which activates the pager 30. In an OFF position the current from the pager battery 37 is deactivated which prohibits the flow of current. The pager battery compartment 36 is depicted as being located on a side surface of the pager enclosure 41 for illustration purposes only, it is known that other locations may be utilized without limiting the scope of the apparatus 10.

The pager 30 also comprises a pager light 31 which provides an illuminating warning means to the user 60. The pager light visually alerts said user 60 that the sensor 22b on the sensor/transmitter 20a has been activated. The pager light 31 is preferably an LED, yet other illumination devices may be utilized without limiting the functions of the apparatus 10.

The pager 30 further comprises a conventional volume switch 35 which provides an adjustable controlling device to an audible or tangible alerting means 45 (see FIG. 6) such as a sound or vibration as abovementioned. The audible altering means 45 to be broadcasted via a conventional speaker 38 located on the pager 30. The volume switch 35 comprises a switching device such as, but not limited to: a pushbutton, a toggle switch, a sliding switch, or the like.

Referring now to FIG. 6, an electrical block diagram of the apparatus 10, according to the preferred embodiment of the present invention, is disclosed. The sensor/transmitter 20a receives power from the battery 26 which is accessed via the battery compartment 25 and interconnected via electrical wiring 70 to the corresponding internal components. With the on/off switch 24 positioned in an activated position the current is able is activate the light 21, the sensor 22b, the transmitter switch 23a, and the transmitter 23b. In use, as an aquatic animal comes in contact with the fishing line on the fishing rod 50 the sensor 22b will illuminate the light 21 and activate the transmitter 23b to send a signal 40 to activate the pager 30.

The pager 30 receives power from the pager battery 37 which is accessed via the pager battery compartment 36 and interconnected via electrical wiring 70 to the corresponding internal components. With the pager on/off switch 34 activated current is able to activate the receiver 32 which accepts the signal 40 from the transmitter 23b. This concurrently illuminates the pager light 31 and broadcasts the audible alerting means 45 through the speaker 38. The sensor switch 22a, receiver switch 33, and volume switch 35 may also be manipulated with the pager 30 in an activated state.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed as indicated in FIG. 1.

The method of utilizing the apparatus 10 may be achieved by performing the following steps: acquiring the apparatus 10; attaching the sensor/transmitter 20a to a desired position on a fishing rod 50 by loosening the thumb screw 28a from the aperture 28b and positioning the rod attachment 29a around a desired surface upon the fishing rod 50; tightening the thumb screw 28a within the aperture 28b to secure the rod attachment 29a in the desired position; position the on/off switch 24 in an activated position; positioning the pager on/off switch 34 in an activated position; selecting a desired setting for the sensor switch 22a, the transmitter switch 23a, the receiver switch 33, and the volume switch 35; placing the pager 30 in a desired secure position on the user 60 via the clip 39; allowing the sensor 22b to transmit a current to the transmitter 23b and illuminate the light 21 when an aquatic animal is on the line of the fishing rod 50; allowing the transmitter 23b to transmit a signal 40 to the receiver 32 and relaying the received signal 40 to the pager light 31 and audible alerting means 45 via a speaker 38; retrieving the aquatic animal on the fishing rod 50 in a conventional manner; deactivating the sensor/transmitter 20a and pager 30 as necessary; utilizing the apparatus 10 as necessary; and, determining the presence of an aquatic animal on an unattended fishing rod 50 as desired.

The method of alternately utilizing the apparatus 10 as a security system may be achieved by performing the following steps: acquiring the apparatus 10; attaching the sensor/transmitter 20a to a desired position on a door, window, or the like by loosening the thumb screw 28a from the aperture 28b and positioning the rod attachment 29a around the desired surface; tightening the thumb screw 28a within the aperture 28b to secure the rod attachment 29a in the desired position; position the on/off switch 24 in an activated position; positioning the pager on/off switch 34 in an activated position; selecting a desired setting for the sensor switch 22a, the transmitter switch 23a, the receiver switch 33, and the volume switch 35; placing the pager 30 in a desired secure position on the user 60 via the clip 39; allowing the sensor 22b to transmit a current to the transmitter 23b and illuminate the light 21 when an intruder or unwanted disturbance activates said sensor 22b; allowing the transmitter 23b to transmit a signal 40 to the receiver 32 and relaying the received signal 40 to the pager light 31 and audible alerting means 45 via a speaker 38; taking care of the intruder or disturbance in a conventional manner; deactivating the sensor/transmitter 20a and pager 30 as necessary; utilizing the apparatus 10 as necessary; and, utilizing the apparatus 10 as a security system as desired.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A fish strike alarming system adapted to be attached to a fishing rod, further comprising:
    a transmitter apparatus removably attachable to said fishing rod further having a sensor assembly that senses a presence of a strike on said fishing rod, comprising:
    a rod attachment portion, having a curvilinear first side adapted for secure and removable attachment to conform to an exterior surface of said fishing rod;
    said sensor assembly comprising a waterproof enclosure; and,
    a pair of braces rigidly affixing a second side of said rod attachment portion to a first side of said sensor assembly; and,
    a receiver apparatus in wireless communication with said transmitter apparatus;
    wherein said transmitter apparatus generates and transmits a strike signal;
    wherein said transmitter apparatus alerts a user upon receipt of said strike signal;
    wherein said receiver apparatus receives said strike signal and further generates an alerting means upon receipt of said strike signal; and,
    wherein said receiver apparatus is worn by or positioned adjacent to said user.

2. The system of claim 1, wherein said rod attachment portion further comprises:
    a "C"-shaped portion defining a gap therebetween; and,
    a securing fastener, comprising a manipulating end extending outward from said one side of said "C"-shaped portion and an engaging end extending inwardly therefrom;
    wherein said fishing rod is inserted within said gap and said fastener secures said rod attachment portion to said fishing rod.

3. The system of claim 1, wherein said transmitter assembly further comprises:
    a sensor assembly housing;
    a transmitter power switch located on an outer surface of said sensor assembly housing and in electrical communication with a transmitter power supply located within a compartment of said sensor assembly housing;
    a transmitter illumination means located on said outer surface of said sensor assembly enclosure in electrical communication with said transmitter power switch;
    said sensor in electrical communication with said transmitter power switch;
    a transmitter switch in electrical communication with said transmitter power switch;

a transmitter in electrical communication with said transmitter switch;

wherein said transmitter power switch energizes said illumination means and said transmitter switch;

wherein said sensor senses a stimulus produced by said strike and generates said strike signal;

wherein said transmitter switch energizes said transmitter;

wherein said strike signal is transmitted by said transmitter upon receipt of said strike signal; and, wherein said transmitter illumination means emits illumination upon receipt of said strike signal.

4. The system of claim 3, wherein said transmitter switch further comprises a multi-positional sliding switch to selectively adjust a strength of said transmitter;

wherein said transmitter strength is adjustable based upon a distance between said transmitter apparatus and said receiver apparatus.

5. The system of claim 1, wherein said receiver apparatus further comprises:

a receiver housing;

a clip located on an outer first surface of said receiver housing;

a receiver power switch located on an outer second surface opposite said first surface in electrical communication with a receiver power supply;

a receiver illumination means located on said receiver housing and in electrical communication with said receiver power switch;

a receiver switch located adjacent to and in electrical communication with said receiver power switch;

a receiver in electrical communication with said receiver switch;

said alerting means in electrical communication with said receiver power switch and said receiver; and, a sensor switch in electrical communication with said receiver power switch;

wherein said receiver power switch energizes said receiver illumination means, said receiver switch, and said alerting means;

wherein said sensor switch selectively adjusts a sensitivity of said sensor of said transmitter assembly;

wherein said receiver receives said strike signal;

wherein said receiver illumination means emits illumination upon receipt of said strike signal;

wherein said alerting means alerts said user upon receipt of said strike signal; and, wherein said clip enables said receiver housing to suspend from a support structure.

6. The system of claim 5, wherein said receiver switch further comprises a multi-positional sliding switch to selectively adjust a strength of said receiver;

wherein said receiver strength is adjustable based upon a distance between said transmitter apparatus and said receiver apparatus.

7. The system of claim 6, wherein said alerting means further comprises a vibrating device.

8. The system of claim 6, wherein said alerting means further comprises an audible device having a volume switch in electrical communication with said receiver power switch and a speaker, said volume switch and said speaker located on said outer second surface.

9. The system of claim 8, wherein said alerting means further comprises a vibrating device.

10. A fish strike alarming system adapted to be attached to a fishing rod, further comprising:

a transmitter apparatus, further comprising:

a rod attachment portion, having a first side adapted for secure and removable attachment to conform to an exterior surface of said fishing rod;

an ultrasonic sensor assembly that senses a presence of a strike on said fishing rod, comprising a waterproof enclosure; and, a pair of braces rigidly affixing a second side of said rod attachment portion to a first side of said sensor assembly;

a receiver apparatus in wireless communication with said transmitter apparatus;

wherein said transmitter apparatus generates and transmits a strike signal upon sensing of said strike;

wherein said transmitter apparatus alerts a user upon receipt of said strike signal;

wherein said receiver apparatus receives said strike signal and further generates an alerting means upon receipt of said strike signal; and, wherein said receiver apparatus is worn by or positioned adjacent to said user.

11. The system of claim 10, wherein said rod attachment portion further comprises:

a "C"-shaped portion defining a gap therebetween; and, a securing fastener, comprising a manipulating end extending outward from said one side of said "C"-shaped portion and an engaging end extending inwardly therefrom;

wherein said fishing rod is inserted within said gap and said fastener secures said rod attachment portion to said fishing rod.

12. The system of claim 10, wherein said transmitter assembly further comprises:

a sensor assembly housing;

a transmitter power switch located on an outer surface of said sensor assembly housing and in electrical communication with a transmitter power supply located within a compartment of said sensor assembly housing;

a transmitter illumination means located on said outer surface of said sensor assembly enclosure in electrical communication with said transmitter power switch;

an ultrasonic sensor in electrical communication with said transmitter power switch;

a transmitter switch in electrical communication with said transmitter power switch;

a transmitter in electrical communication with said transmitter switch;

wherein said transmitter power switch energizes said illumination means and said transmitter switch;

wherein said ultrasonic sensor senses a stimulus produced by said strike and generates said strike signal;

wherein said transmitter switch energizes said transmitter;

wherein said strike signal is transmitted by said transmitter upon receipt of said strike signal; and, wherein said transmitter illumination means emits illumination upon receipt of said strike signal.

13. The system of claim 12, wherein said transmitter switch further comprises a multi-positional sliding switch to selectively adjust a strength of said transmitter;

wherein said transmitter strength is adjustable based upon a distance between said transmitter apparatus and said receiver apparatus.

14. The system of claim 10, wherein said receiver apparatus further comprises:
a receiver housing;
a clip located on an outer first surface of said receiver housing;
a receiver power switch located on an outer second surface opposite said first surface in electrical communication with a receiver power supply;
a receiver illumination means located on said receiver housing and in electrical communication with said receiver power switch;
a receiver switch located adjacent to and in electrical communication with said receiver power switch;
a receiver in electrical communication with said receiver switch;
said alerting means in electrical communication with said receiver power switch and said receiver; and,
a sensor switch in electrical communication with said receiver power switch;
wherein said receiver power switch energizes said receiver illumination means, said receiver switch, and said alerting means;
wherein said sensor switch selectively adjusts a sensitivity of said ultrasonic sensor of said transmitter assembly;
wherein said receiver receives said strike signal;
wherein said receiver illumination means emits illumination upon receipt of said strike signal;
wherein said alerting means alerts said user upon receipt of said strike signal; and,
wherein said clip enables said receiver housing to suspend from a support structure.

15. The system of claim 14, wherein said receiver switch further comprises a multi-positional sliding switch to selectively adjust a strength of said receiver;
wherein said receiver strength is adjustable based upon a distance between said transmitter apparatus and said receiver apparatus.

16. The system of claim 15, wherein said alerting means further comprises a vibrating device.

17. The system of claim 15, wherein said alerting means further comprises an audible device having a volume switch in electrical communication with said receiver power switch and a speaker, said volume switch and said speaker located on said outer second surface.

18. The system of claim 17, wherein said alerting means further comprises a vibrating device.

* * * * *